United States Patent [19]
Snider

[11] Patent Number: 6,018,131
[45] Date of Patent: Jan. 25, 2000

[54] SWITCH PAD WITH INTEGRATED SQUEAK AND RATTLE ELIMINATOR AND METHOD OF MANUFACTURE AND USE

[75] Inventor: Chris Ralph Snider, El Paso, Tex.

[73] Assignee: Delco Electronics Corporation, Kokomo, Ind.

[21] Appl. No.: 09/237,312

[22] Filed: Jan. 26, 1999

[51] Int. Cl.[7] .............................. H01H 3/60; H01H 9/04
[52] U.S. Cl. ..................... 200/301; 200/302.1; 200/308
[58] Field of Search .................................. 200/5 R, 5 A, 200/512–517, 308–315, 341, 345, 293, 302.1, 302.2, 302.3, 301

[56] References Cited

U.S. PATENT DOCUMENTS

| | | | |
|---|---|---|---|
| 3,924,116 | 12/1975 | Brindley | 200/345 X |
| 4,404,445 | 9/1983 | Baran et al. | 200/314 |
| 5,636,729 | 6/1997 | Wiciel | 200/314 X |
| 5,762,365 | 6/1998 | Worrell et al. | 200/61.54 X |
| 5,822,690 | 10/1998 | Rynk et al. | 200/313 X |

*Primary Examiner*—J. R. Scott
*Attorney, Agent, or Firm*—Jimmy L. Funke

[57] ABSTRACT

In a preferred embodiment, a control assembly, including: a housing; a control element assembly disposed in the housing; a pushbutton assembly disposed in the housing; a switch pad disposed between the control element assembly and the pushbutton assembly; a faceplate covering an end of the housing; a display lens disposed between the switch pad and the faceplate and having a front surface thereof adjacent a rear surface of a flange surrounding an opening defined through the faceplate to permit viewing through the display lens of an information display in the housing; and a gasket disposed between the front surface of the display lens and the rear surface of the flange to prevent squeaking and rattling caused by mechanical interaction of the display lens and the faceplate.

9 Claims, 6 Drawing Sheets

SWITCH PAD WITH INTEGRATED SQUEAK AND RATTLE ELIMINATOR AND METHOD OF MANUFACTURE AND USE

BACKGROUND OF THE INVENTION

1. Field of the Invention

The present invention relates to controls employing switch pads generally and, more particularly, but not by way of limitation, to a novel switch pad that includes an integrated squeak and rattle eliminator.

2. Background Art

Automobile controls often use an information display that requires a lens to be assembled in front of that display. Typically, the lens is secured to a relatively hard, component part either by a molded in snap feature or by a secondary operation requiring heat staking, ultrasonic welding, or an applied adhesive. The problems that can occur with these approaches are as follows: (1) snaps can break during assembly or relax under heat load, resulting in a squeak or rattle caused by rubbing of the lens against the component part; (2) heat staking or ultrasonic welding depends on set-up consistency which may not be repeatable, also resulting in a squeak or rattle; and (3) applied adhesive can be inconsistent and cause unsightly seepage into a visible or "show" area.

Accordingly, it is a principal object of the present invention to provide a squeak and rattle eliminator for an automobile display that is reliable.

A further object of the invention is to provide such a squeak and rattle eliminator that is simple and does not cause unsightly seepage.

An additional object of the invention is to provide such a squeak and rattle eliminator and method of manufacture in which the squeak and rattle eliminator is an integral part of a switch pad.

It is another object of the invention to provide such a squeak and rattle eliminator and method of manufacture that require no tooling in addition to that required to produce a switch pad.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a control assembly, comprising: a housing; a control element assembly disposed in said housing; a pushbutton assembly disposed in said housing; a switch pad disposed between said control element assembly and said pushbutton assembly; a faceplate covering an end of said housing; a display lens disposed between said switch pad and said faceplate and having a front surface thereof adjacent a rear surface of a flange surrounding an opening defined through said faceplate to permit viewing through said display lens of an information display in said housing; and a gasket disposed between said front surface of said display lens and said rear surface of said flange to prevent squeaking and rattling caused by mechanical interaction of said display lens and said faceplate.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Reference should now be made to the drawing figures on which similar or identical elements are given consistent identifying numerals throughout the various figures thereof, and on which parenthetical references to figure numbers direct the reader to the view(s) on which the element(s) being described is (are) best seen, although the element(s) may be seen on other figures also.

Figure 1:
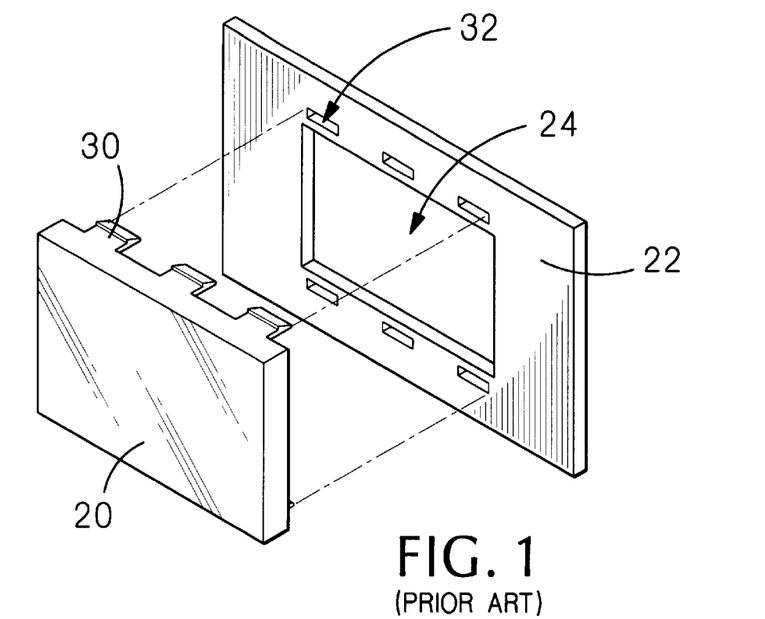
FIG. 1 is an isometric front view of one conventional method of attaching a lens to a panel.

FIG. 1 illustrates one conventional method of attaching a lens 20 to a trim panel 22 which surrounds an opening 24 defined in the trim panel, through which opening will be visible some sort of information display (not shown). It may be assumed that trim panel is or will be installed in a vehicle dashboard, for example, although the lenses and trim panels described herein may be employed in other applications as well. In this case, lens 20, which is typically clear or translucent plastic, has a plurality of snaps, as at 30, integrally molded with the lens. Lens 20 is secured to trim panel 22 by means of inserting the plurality of snaps 30 into a corresponding plurality of complementary openings, as at 32, defined through the trim panel and arrayed along opposite sides of opening 24, with the snaps being plastically deformed as they are inserted in the openings. As noted above, problems with this type of arrangement are that one or more snaps 30 may break during insertion and later exposure to a heat load, for example from the display, may cause the snaps to relax and create a squeak and/or rattle as lens 20 moves relative to trim panel 22.

Figure 2:
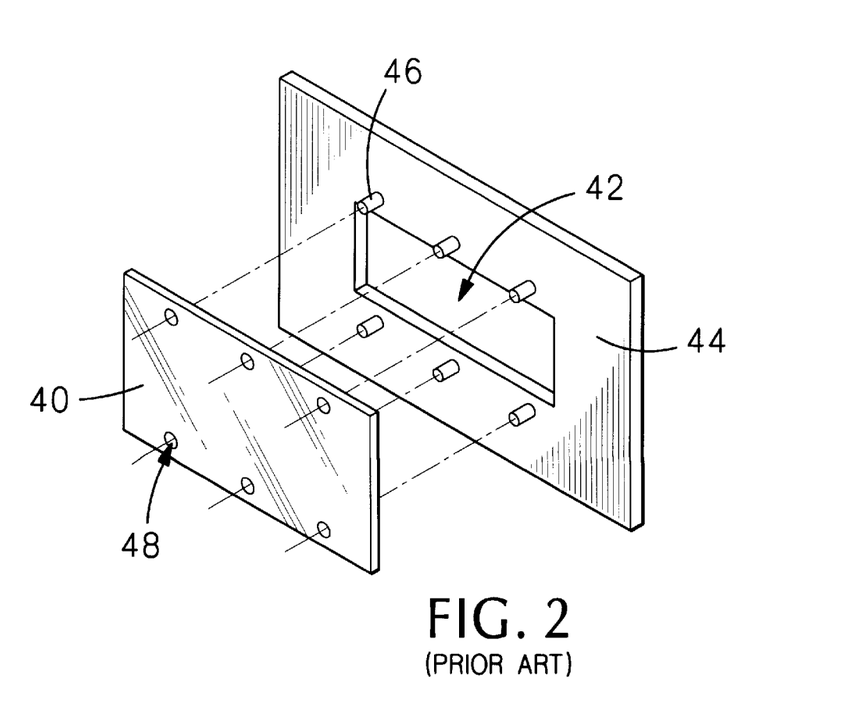
FIG. 2 is an isometric rear view of another conventional method of attaching a lens to a panel.

FIG. 2 illustrates another conventional method of attaching a lens 40 to cover an opening 42 defined in a trim panel plate 44. Here, a plurality of stake posts, as at 46, similar to snaps 30 (FIG. 1), are inserted through clearance holes, as at 48, defined through trim plate 44. This method suffers from the same problems as does the use of snaps 30 described above with reference to FIG. 1.

Figure 3:
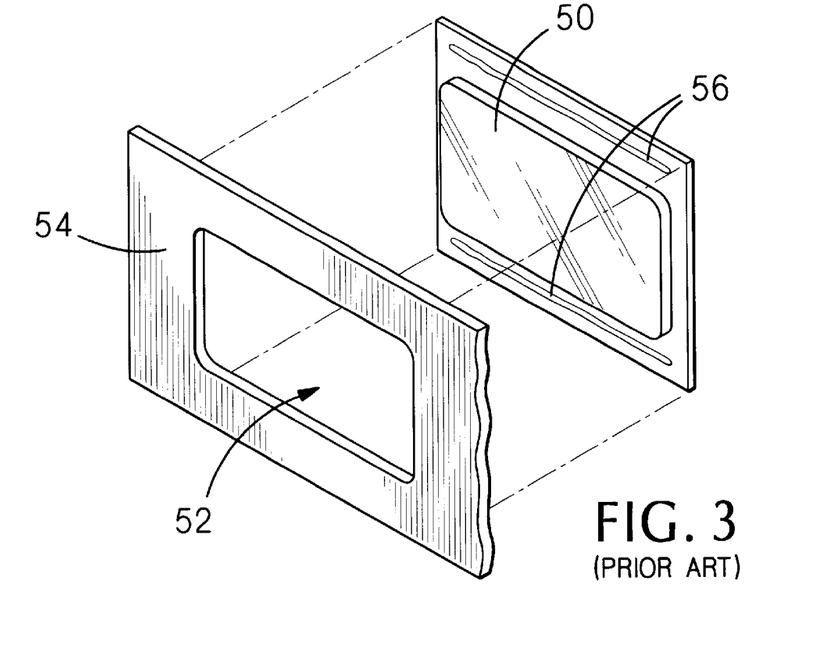
FIG. 3 is an isometric front view of an additional conventional method of attaching a lens to a panel.

FIG. 3 illustrates an additional conventional method of attaching a lens 50 to cover an opening 52 defined in a trim panel 54. Here, lines of adhesive 56 are applied to lens 50 above and below the area of the lens which will be visible through opening 52 and then the lens is pressed to the rear surface of trim panel 54. As noted above, this method can suffer from inconsistent application of the adhesive and there may be unsightly seepage of the adhesive.

Figure 4:
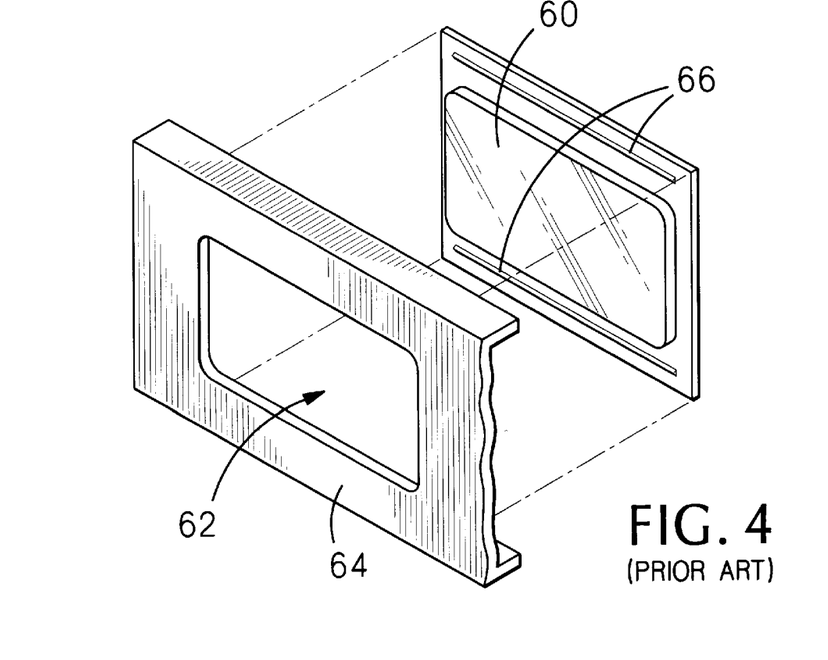
FIG. 4 is an isometric front view of a further conventional method of attaching a lens to a panel.

FIG. 4 illustrates a further conventional method of attaching a lens 60 to cover an opening 62 defined in a trim panel 64. Here, lens 60 is placed against the rear surface of trim panel 64 and then ultrasonically welded to the trim panel along lines 66 similar to lines of adhesive 56 (FIG. 3). As noted above, this method requires additional manufacturing equipment and an additional manufacturing step.

Figure 5:
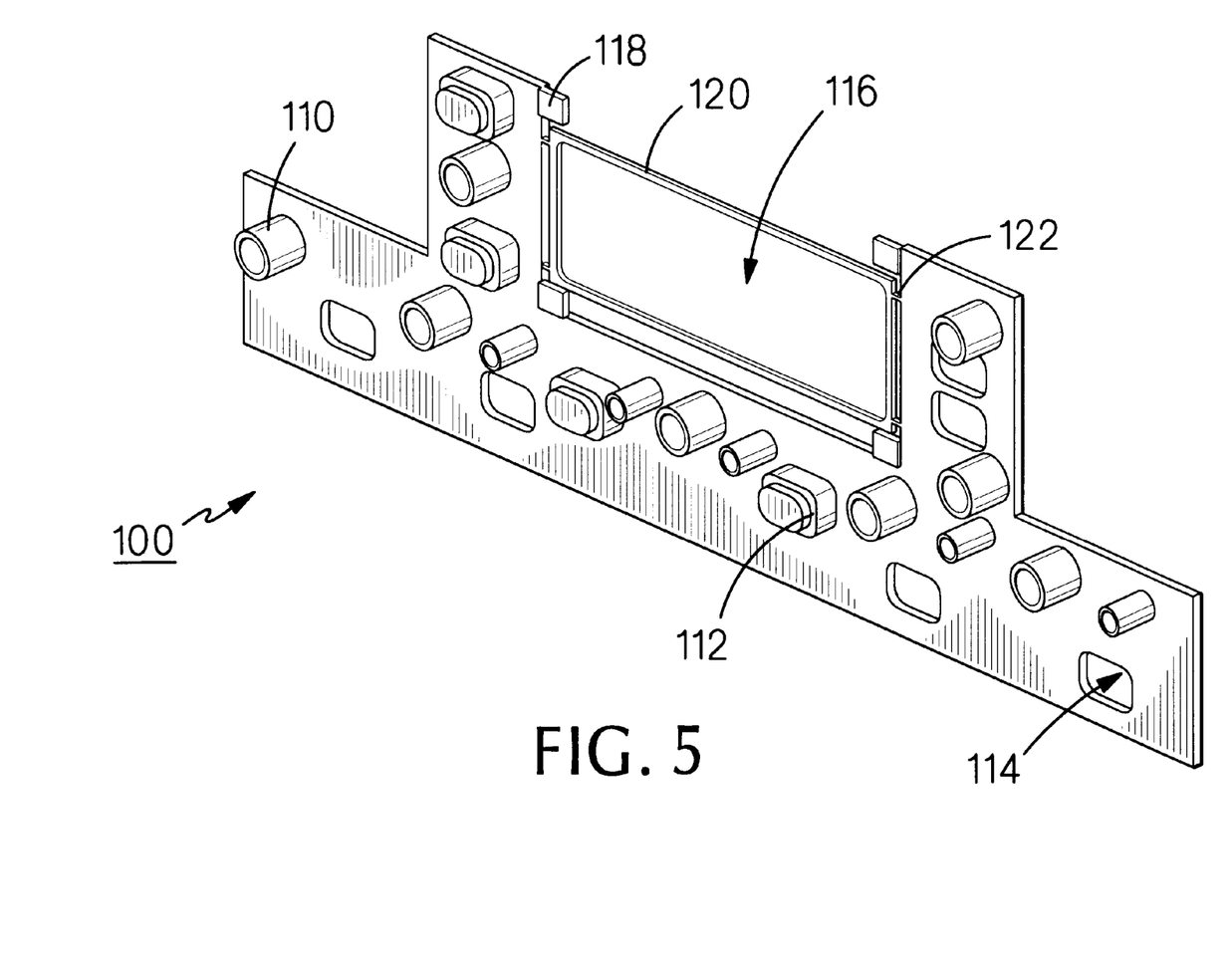
FIG. 5 is an isometric view of a switch pad according to the present invention.

FIG. 5 illustrates a switch pad, constructed according to the present invention, and generally indicated by the reference numeral 100. Switch pad 100 is formed of a resilient material such as rubber and, as is described more fully below, is disposed as a gasketing member between a push button assembly and a printed circuit board in a dashboard control panel, for example.

Continuing to refer to FIG. 5, switch pad 100 includes integrally molded therein a plurality of chimneys or surrounds, as at 110, for LEDs or lamps (none shown); a plurality of openings, as at 114, for lamps (none shown); a rectangular central opening 116 for a display lens (not shown on FIG. 5); and four pads, as at 118, disposed at each corner of rectangular central opening 116. The elements of switch pad 100 described so far are conventional and the particular arrangement thereof is shown for illustrative purposes only. Switch pad 100 further includes integrally molded therewith a display lens gasket 120. It will be seen that, as molded, display lens gasket 120 is attached to switch pad 100 by means of four integrally molded segments, as at 122.

Figure 6:
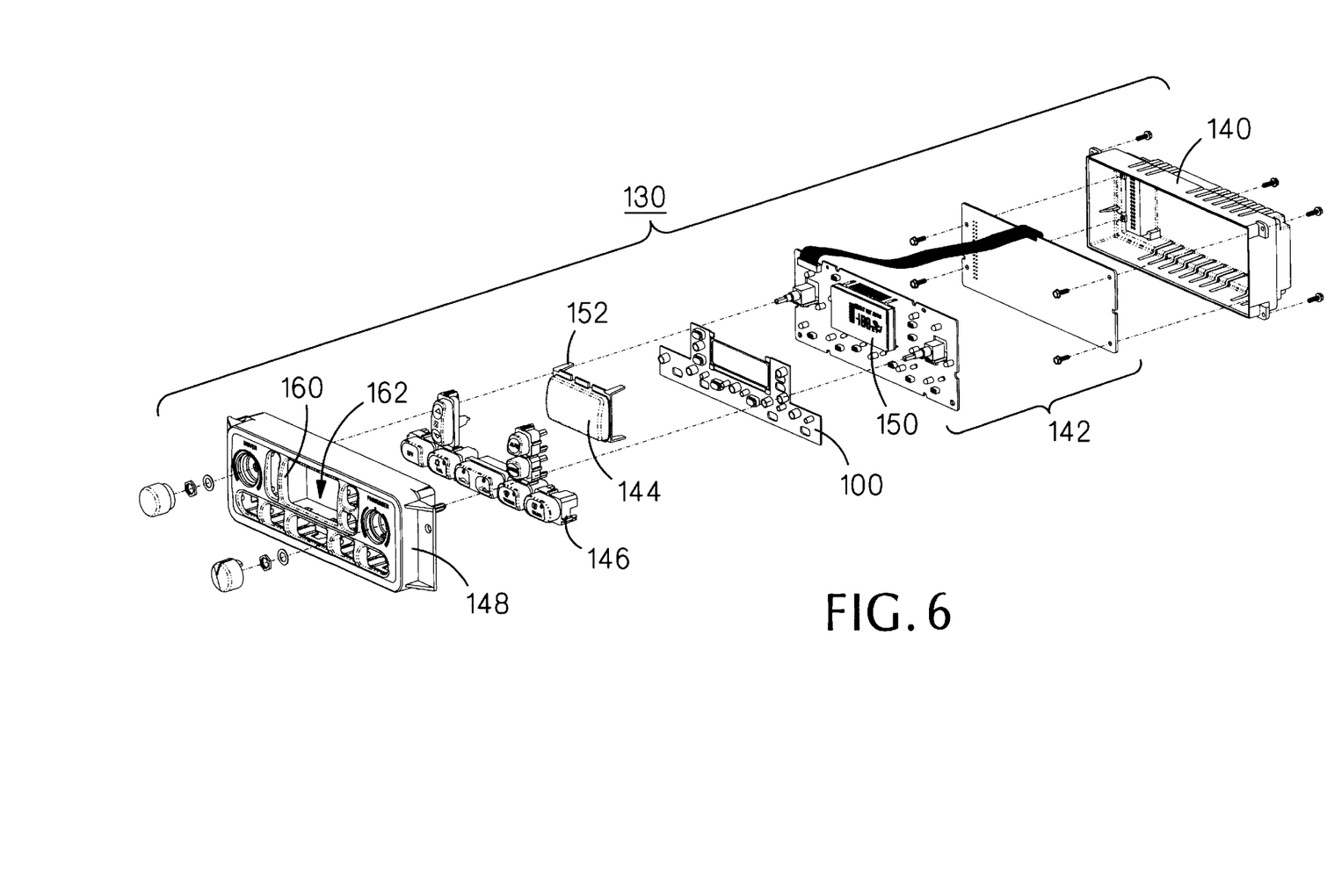
FIG. 6 is an exploded isometric view of a control assembly employing the present invention.

FIG. 6 illustrates a control assembly in which the present invention may be employed, the control assembly being indicated generally by the reference numeral 130, which may be assumed to be, for illustrative purposes only, a control assembly for mounting in the dashboard of a vehicle (not shown). Control assembly 130 includes, in positions of assembly, a case 140, a circuit board assembly 142 containing control elements of the control assembly, switch pad 100 (shown as molded), a display lens 144, a pushbutton assembly 146, and a faceplate 148.

When control assembly 130 is assembled, display lens 144 will cover a display 150 on circuit board assembly 142, with the distal ends of the four legs, as at 152, of the display lens engaging the four pads 118 on switch pad 100 (FIG. 5). The front of display lens 144 will fit against a flange 160 formed around an opening 162 defined through faceplate 148. The function of gasket 120 in switch pad 100 (FIG. 5) as a squeak and rattle eliminator will now be discussed.

Figure 7:
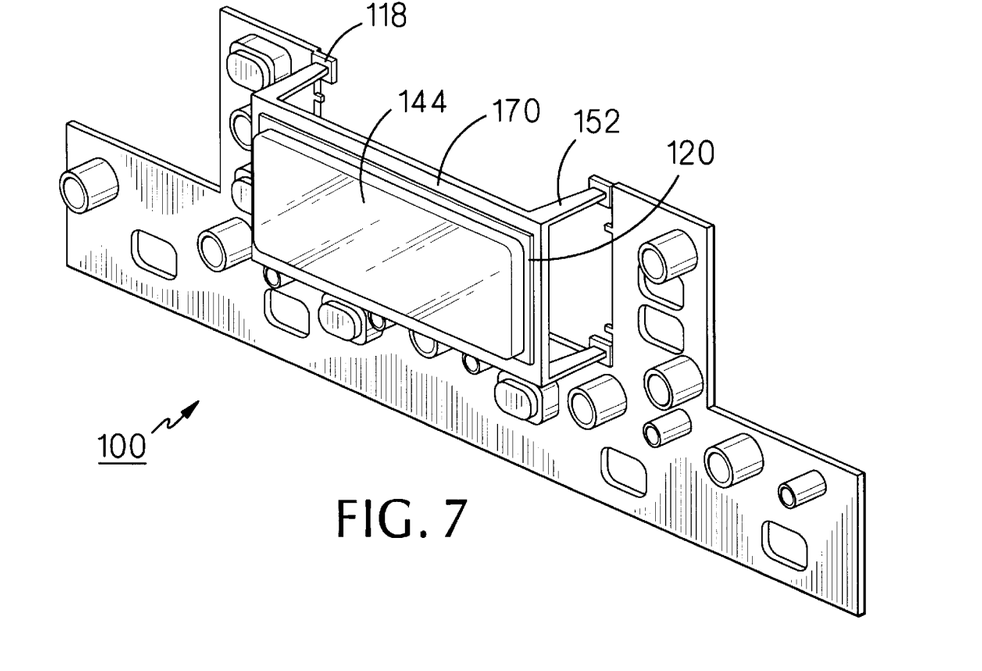
FIGS. 7 and 8 are isometric views of alternative methods of using the present invention.

FIG. 7 illustrates one method of using gasket 120 of switch pad 100 as a squeak and rattle eliminator by providing a cushion between the front of display lens 144 and the rear surface of flange 160 on faceplate 148. Here, during the assembly operation, gasket 120 has been separated from switch pad 100 by severing segments 122 (FIG. 5) which, if made thin enough, can simply be manually broken. Then, gasket 120 is placed on a flange 170 formed around the edge of display lens 144 and the elements of control assembly 130 (FIG. 6) joined together.

Figure 8:
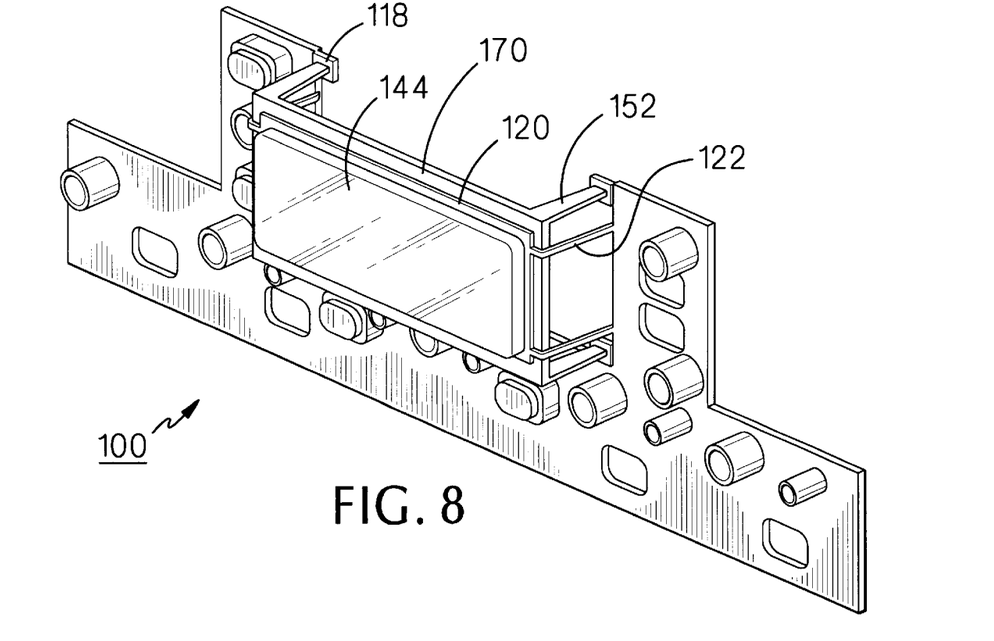

FIG. 8 illustrates an alternative method of using gasket 120 of switch pad 100 as a squeak and rattle eliminator. Here, segments 122 have been made sufficiently robust that the segments may be stretched without the severing thereof so that gasket 120 may be stretched to place it in position on flange 170.

FIGS. 7 and 8 also illustrate more clearly the engagement of the distal ends of legs 152 of display lens 144 and pads 118 on switch pad 100, which engagement is the same regardless of which method of using gasket 120 is employed.

Figure 9:
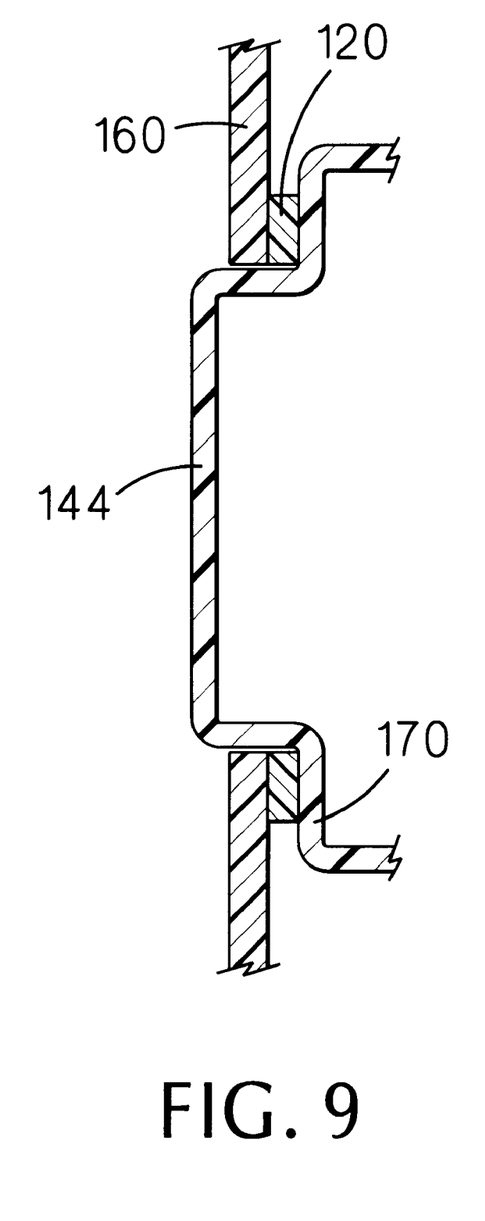
FIG. 9 is a fragmentary, side elevational, cross-sectional view of a lens mounted according to the present invention.

FIG. 9 illustrates a portion of assembled control assembly 130 (FIG. 6) which includes display lens 144 inserted through opening 162 in faceplate 148, with gasket 120 disposed between flange 160 on the faceplate and flange 170 on the display lens. So arranged, any possibility of squeaking or rattling of display lens 144 caused by mechanical interaction of the display lens and surrounding elements is eliminated by the cushioning provided by gasket 120. Either of the methods shown on FIGS. 7 and 8 may be used to provide the required cushioning.

An important feature of the present invention is that gasket 120 is incorporated into switch pad 100 which is an existing part, as it is molded and, therefore, no separate manufacturing step is required and no special equipment such as an ultrasonic welder or heat staker is required.

Switch pad 100 with integral gasket 120 is preferably molded of rubber using conventional techniques known in the art. Rubber offers the capability of molding a single part with varying degrees of hardness and color. For example, white may be required for light reflection at lamp clearance holes on switch pad 100, while black may be required for gasket 120. More or less robust rubber material may be employed for segments 122 depending on whether gasket 120 will be used in the manner indicated on FIG. 7 or in the manner indicated on FIG. 8. The various colors, as well as varying hardness, can easily be molded into switch pad 100 using conventional manufacturing techniques.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. A control assembly, comprising:
   (a) a housing;
   (b) a control element assembly disposed in said housing;
   (c) a pushbutton assembly disposed in said housing;
   (d) a switch pad disposed between said control element assembly and said pushbutton assembly;
   (e) a faceplate covering an end of said housing;
   (f) a display lens disposed between said switch pad and said faceplate and having a front surface thereof adjacent a rear surface of a flange surrounding an opening defined through said faceplate to permit viewing through said display lens of an information display in said housing; and
   (g) a gasket disposed between said front surface of said display lens and said rear surface of said flange to prevent squeaking and rattling caused by mechanical interaction of said display lens and said faceplate.

2. A control assembly, as defined in claim 1, wherein: said gasket is integrally molded with said switch pad and attached thereto by inegrally molded segments, said integrally molded segments being stretched sufficiently to permit said gasket to be placed on said front surface of said display lens, while said gasket remains attached to said switch pad.

3. A control assembly, as defined in claim 2, wherein: said molded segments are sufficiently weak to permit the severing thereof to remove said gasket from said switch pad and the subsequent placement thereof on said front surface of said display lens.

4. A gasket for placement between a flange formed around an opening defined through a faceplate in a control assembly and a front surface of a display lens, said display lens being disposed between said faceplate and a switch pad in said control assembly, and said gasket being molded of one piece with said switch pad, said gasket being provided to prevent squeaking and rattling caused by mechanical interaction of said display lens and said flange.

5. A gasket, as defined in claim 4, wherein: said gasket is attached to said switch pad by integrally molded segments, said integrally molded segments being stretchable to permit said gasket to be placed on said front surface of said display lens, while said gasket remains attached to said switch pad.

6. A gasket, as defined in claim 4, wherein: said gasket is attached to said switch pad by integrally molded segments when said switch pad is molded, said integrally molded segments being severable to permit said gasket to be removed from said switch pad and placed on said front surface of said display lens.

7. A method of manufacturing and using a gasket for interposition between a front surface of a display lens in a control assembly and a rear surface of a flange surrounding a faceplate in said control assembly, said method comprising:

(a) molding a switch pad for said control assembly, said molded switch pad including molded therewith said gasket attached thereto by integrally molded segments;

(b) placing said gasket on said front surface of said display lens; and (c) placing said front surface of said display lens against said rear surface of said flange, with said gasket intereposed therebetween to prevent squeaking and rattling caused by mechanical interaction of said display lens and said flange.

8. A method, as defined in claim 7, wherein: step (b) includes stretching said integrally molded segments to permit said gasket to be placed on said front surface of said display lens, while said gasket remains attached to said switch pad.

9. A method, as defined in claim 7, wherein: step (b) includes severing said integrally molded segments so as to remove said gasket from said switch pad to permit said gasket to be placed on said front surface of said display lens.

\* \* \* \* \*

UNITED STATES PATENT AND TRADEMARK OFFICE
CERTIFICATE OF CORRECTION

PATENT NO. : 6,018,131
DATED : January 25, 2000
INVENTOR(S) : Snider

It is certified that error appears in the above-identified patent and that said Letters Patent is hereby corrected as shown below:

Column 3, line 16, please insert following "shown)" --a plurality of switch domes, as at 112;--.

Signed and Sealed this

Thirtieth Day of May, 2000

Attest:

Q. TODD DICKINSON

Attesting Officer

*Director of Patents and Trademarks*